United States Patent [19]
Andrews

[11] 3,980,153
[45] Sept. 14, 1976

[54] MOTOR VEHICLE OIL DROP PAN APPARATUS DEVICE FOR INDIRECTLY SAVING LIVES AND ACCIDENTS ON A HIGHWAY

[76] Inventor: Peter Andrews, 190 Gebhardt Road, Penfield, N.Y. 14526

[22] Filed: May 7, 1974

[21] Appl. No.: 467,719

Related U.S. Application Data

[60] Continuation-in-part of Ser. No. 315,174, Dec. 14, 1972, Pat. No. 3,809,175, which is a continuation-in-part of Ser. No. 94,793, Dec. 3, 1970, abandoned, which is a continuation-in-part of Ser. No. 532,831, Feb. 21, 1966, Pat. No. 3,669,204, and Ser. No. 750,094, Aug. 3, 1968, Pat. No. 3,590,937, which is a continuation-in-part of Ser. No. 508,625, Oct. 21, 1965, Pat. No. 3,396,810, which is a division of Ser. No. 288,159, June 17, 1963, abandoned.

[52] U.S. Cl. ............................................. 180/69.1
[51] Int. Cl.² ......................................... B62D 25/20
[58] Field of Search ................................. 180/69, 1

[56] References Cited
UNITED STATES PATENTS

| | | | |
|---|---|---|---|
| 2,618,351 | 11/1952 | Giacosa | 180/69.1 |
| 2,783,848 | 3/1957 | Beskid | 180/69.1 |
| 2,841,245 | 7/1958 | Colgan | 180/69.1 UX |
| 2,868,329 | 1/1959 | Phelps | 180/69.1 UX |
| 2,899,019 | 8/1959 | Colgan | 180/69.1 UX |
| 2,931,453 | 4/1960 | Inglese | 180/69.1 |

*Primary Examiner*—M. H. Wood, Jr.
*Assistant Examiner*—Milton L. Smith

[57] ABSTRACT

At least an entirely upstanding walled receptacle apparatus device which has an entirely upstanding and surrounding walled receptacle that is removably secured in one embodiment or is hooked onto and also removably secured to at least one cross member or to at least one portion of a motor vehicle of the race car, automobile or car, truck, bus and boat type, and accordingly having at least one portion of oil or fluid drippings retained therein. The apparatus device is also for specific use in a boat type of non-highway used motor vehicle to prevent at least one portion of the inland waters from being oil polluted. The apparatus receptacle portion, in one of its embodiments, having and retaining therein at least one separate material for at least retaining one portion of the oil or fluid which drips therein from at least one portion of at least one of the above disclosed motor vehicles. The oil or fluid dripping being captured and generally retained in at least one portion of the receptacle portion of the apparatus and/or at least one portion of a separate material which is retained in the receptacle portion of the apparatus. The oil or fluid generally leaks or drips from, and even into the boat type of disclosed motor vehicles which have a defective oil or fluid gasket, seal and the like. The apparatus device substantially prevents the captured or dripped in fluid drippings from being spilled, ejected or dumped substantially out of a separate material retained in the apparatus' receptacle or substantially out of a separate nestable receptable subcombination which is retained on the apparatus' receptacle and onto, for example, a roadway's, race track's, highway's (car, truck and bus) travelling surface. Thereby, "summer icing" of the disclosed traveled surfaces and "viscous hydroplaning" of the motor vehicle's tires thereon, is substantially prevented, and especially when the motor vehicle's are abruptly started, stopped, curving or curving in and out at a high rate or speed or even merely travelling at a very high rate of speed.

52 Claims, 7 Drawing Figures

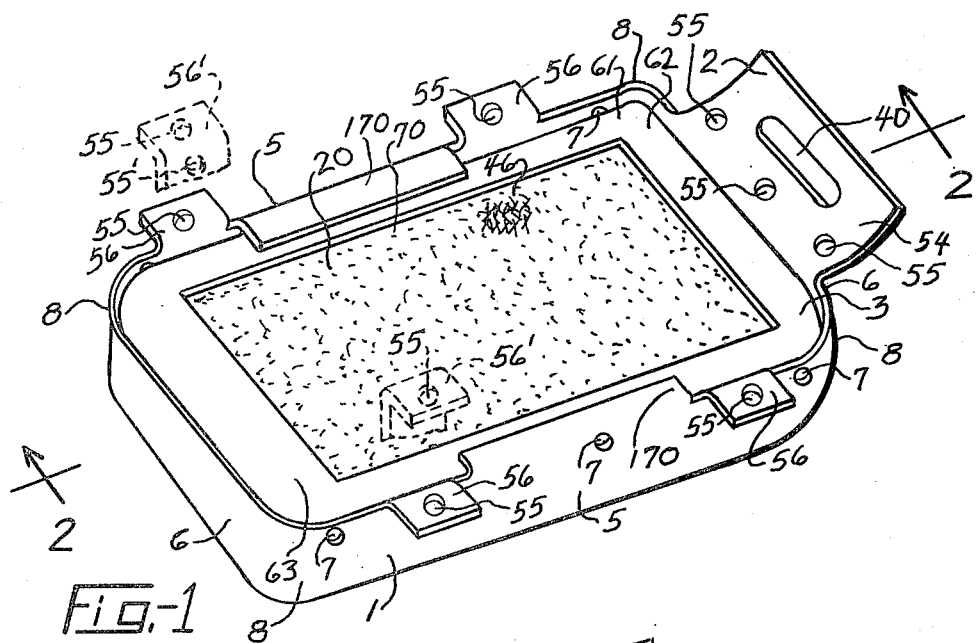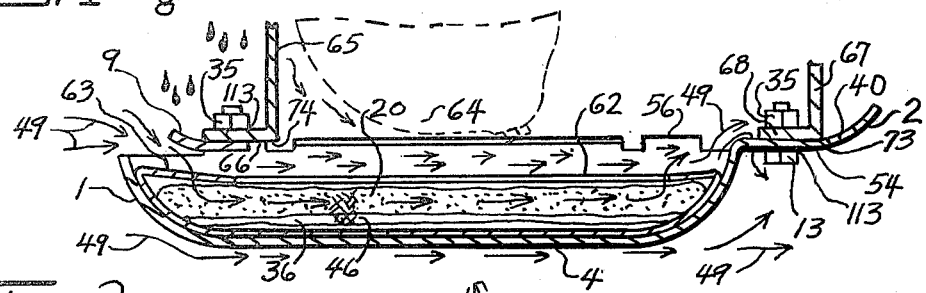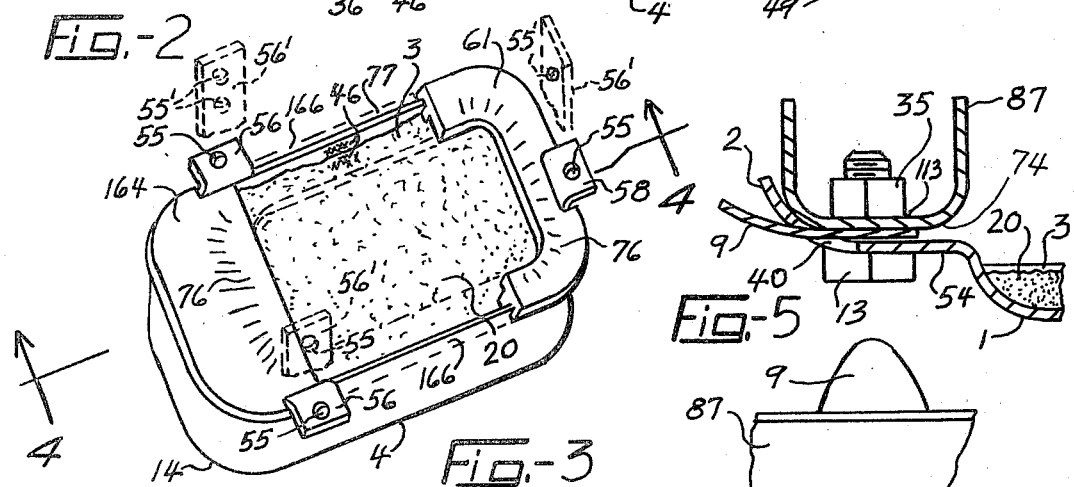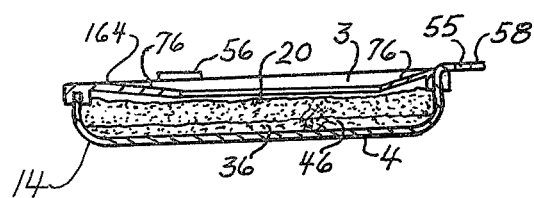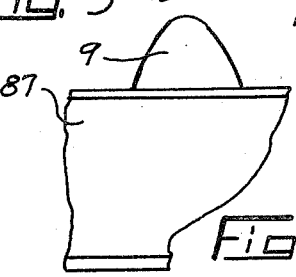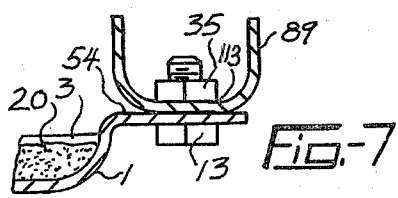

MOTOR VEHICLE OIL DROP PAN APPARATUS DEVICE FOR INDIRECTLY SAVING LIVES AND ACCIDENTS ON A HIGHWAY

This application is a continuation-in-part of my copending application Ser. No. 315,174 filed Dec. 14, 1972, now U.S. Pat. No. 3,809,174, issued May 7, 1974, which was a continuation-in part of application Ser. No. 94,793 filed Dec. 3, 1970 U.S. now abandoned; which was a continuation-in-part of copending application Ser. No. 532,831 filed Feb. 21, 1966, now U.S. Pat. No. 3,669,204, issued June 13, 1972; and of application Ser. No. 750,094 filed Aug. 3, 1968, now U.S. Pat. No. 3,590,937 issued July 6, 1971 (Saturday) thereby given a filing date of Aug. 5, 1968; and which Ser. No. 750,094 application was a continuation-in-part of application Ser. No. 508,625 application filed Oct. 21, 1965, now U.S. Pat. No. 3,396,810 issued Aug. 13, 1968; which was a divisional of the parent application Ser. No. 288,159 filed June 17, 1963, which is now abandoned.

The apparatus device or invention portion of this specification relates to and is in operative association with a motor vehicle, for example, in one of its embodiments with at least one first type of motor vehicle, and being a car, race car, truck or bus to prevent the surface or material that is substantially under the above mentioned motor vehicles from becoming polluted by fluid drippings; from becoming a slimy dangerous slippery surface for the above motor vehicles to travel thereon, especially at a high rate of speed; a disgustful sight; a contaminated or impaired surface by the disclosed fluid drippings which is dripping from especially the cars, trucks, and buses.

The oil or fluid leaks and drips from various parts of the above mentioned latter three motor vehicles as, for example, when they are stalled, in an accident, parked, standing, slowly moving and even when they are moving at a high rate of speed on the highway's surface, for example.

Fluid drip receiving receptacles, pans, trampoline, shelf-like, hinged pans and the like devices have previously been constructed and secured or were to be secured to a car, truck and bus type of motor vehicle, to retain the fluid drippings which drips only from thereunder. However, not one prior art oil or fluid drip pan device was removably secured to and under race cars, cars, trucks, and/or buses, under at least one portion of the internal combustion engine in boats which is a second type of motor vehicle, because all the prior art fluid drip retaining devices were all designed to receive the fluid drippings only when the car, truck or bus motor vehicle was parked in a garage, on a driveway and/or a street. Not one prior art even hints or suggests to prevent oil or fluid drippings on the highways, and especially not on a race track when a race car motor vehicle is in motion, so that at least lives will be saved, accidents prevented and the like as more fully disclosed in the objects of this specification, which objects were also substantially disclosed in my referenced copending applications.

Not one prior art hints or suggests the use of a fluid drip pan device in a boat to prevent oil or fluid pollution of the inland waters.

Not one prior art fluid dripping device that I am aware of in whole or in part has ever been hooked and removably secured, by at least one bolt or by at least one nut and bolt means, a fluid drip retaining receptacle device to at least one, or even to at least two cross members of a motor vehicle, to prevent the dripping oil or fluid from being deposited on the race track's or the highway's surface, and at the same time to further thereby also provide a very, very strong and very safe oil or fluid drip retaining skidplate or skidpan type of apparatus device, as a whole, having a receptacle portion that cannot be easily torn off by water, air, ice, snow, or even stones, or even dirt, sod and the like, for example, when the motor vehicle is in motion on a highway or roadway or even on a rough unpaved roadway.

Not one of the prior art fluid drip retaining devices, that I am aware of suggests, hints or discloses the use of a catalyst, or an oil eating bacteria or even air permeable material or even Cab-O-Sil which, specifically, is a submicroscopic fire-dry fumed silica material or a silane treated material in a receptacle which is in the receptacle portion of their apparatus or device or even in the receptacle of the apparatus to thereby provide at least one of the condensed objects of this invention, and great utility disclosed in this specification of saving lives, preventing accidents, etc., preventing inland water from being further polluted or even just fluid polluted.

Three prior art fluid drip retaining patented devices were designated for specifically capturing the dripping oil or fluid in a receptacle portion thereof, when the motor vehicle is parked in a garage or driveway, and then uses only the motor vehicle's generated draft of air for ejecting, dumping or discharging and the like of the receptacle's retained oil or fluid directly on the roadway's or highways's surface, and thereby being for the direct opposite to the principal objects of this oil or fluid retaining apparatus invention or device. The greatest utility on earth is "saving lives" at least on the highways and as past President Lyndon B. Johnson stated: "The challenge we dare not disregard". . . "unless we avert the slaughter on the highways, one out of every two Americans will be killed or seriously injured on our highways . . .. "

The three oil or fluid ejecting, dumping or discharging prior art devices are respectively: W. G. Colgan, U.S. Pat. No. 2,841,245 filed May 10, 1956 and issued July 1, 1958; E. I. Phelps U.S. Pat. No. 2,868,329 filed July 17, 1956, and issued Jan. 13, 1959; and again W. G. Colgan U.S. Pat. No. 2,899,019 filed Nov. 4, 1957, and issued Aug. 11, 1959.

Another prior art oil drip pan device is that of J. Beskid, U.S. Pat. No. 2,783,848, filed Aug. 13, 1954, and issued Mar. 5, 1957, and which device was filed before the previously disclosed three oil dumping and/or discharging devices. Beskid's device inherently forces his cardboard which is in his container or receptacle, against the bottom of the oil pan sump or engine with spring force so that the container will not rattle.

The term "fluid" is used in this specification and claims to specifically designate an oil or grease mineral lubricant having hydrocarbons therein as well as non-mineral, or even synthetic lubricants that produces a very dangerous, slippery or slimy and polluted surface when dripped or spilled on a race track, roadway, especially on a highway, which term "fluid" being understood as being "fluid drippings" (fluid which has dripped from at least one portion of the motor vehicle) and which drippings are being substantially retained in the receptacle 3 or 62, or in the receptacle 3 and/or 62, or even in the material 20 which, for simplification, is to also represent all of the materials 6, 117, 118, 119 or 120, and which latter 5 materials being disclosed in applicant's copending Ser. No. 532,831 application, filed Feb. 21, 1966.

The latter 5 materials being illustrated in FIGS. 14 and 15 of the Ser. No. 532,831 drawing. The material 6 is stated as being a cleaned material, a foamed therein material, a carpet material having upstanding piles, an open cell foam material or even an open cell foam urethane, polyester and the like material, a layered material, a stratum layered material having a variable degree of density per layer, a sandwich layer material having a variable degree of density per layer, glass wool, rock wool, honeycombed open ended material and 117 being hexagonal shaped material, 118 being interlocking partitions as are egg cartons, 119 being a square upstanding material and 120 being paper toweling, soil, or earth material.

CONDENSED OBJECTS OF MY INVENTION

A condensed version of the objects of this apparatus invention that are disclosed in this application are:

1. Saving lives on the highways.
2. Preventing accidents and personal injury on the highways.
3. Preserving the public's or one's health through at least one less portion of air pollution.
4. Saving money, at least $35.00 to $75.00 for motor vehicle fluid dripping owners.
5. Saving millions of dollars for the cities, state and federal government combined.
6. Preventing an inside surface of a motor boat from being fluid polluted and also preventing substantially a fire hazard in the bilge of the boat, and further, by even inserting a bilge cleaner and/or a detergent into the receptacle, or even into the material or into a separate receptacle retained in the apparatus' receptacle.
7. Preventing an inside surface of a monorail motor vehicle from being fluid polluted and thereby also fire hazardous.
8. Preventing a race car motor vehicle from being excluded from an important 500 mile race on a race track.
9. Preserving friendly relations between the motoring public, neighbors, friends, and delivery truck drivers and owners with customers, which customers do not allow the fluid dripping trucks on their driveways, as in Hollywood, for example.
10. Providing a minimum of expense to the motor vehicle fluid dripping public by buying and mounting this apparatus invention to the cross members of their motor vehicle by use of at least one available hole and/or bolt means or even at least one bolt and nut means on the motor vehicle.
11. Preventing at least one portion of the water of, for example, a river, pond, lake and/or coastal waterways from being fluid polluted as when water and fluid drippings or even an emulsion of water, bilge cleaner or detergent and fluid are pumped or dumped out of a boat and into the water.
12. Provide an apparatus device which is substantially self-cleaning by having surface water or rain water, which water floods, at least one portion of the fluid drippings, which are retained in at least one portion of the device, out of the device and thereby be floated on the surface of the rain water to the sides of a highway, for example.

OBJECTS OF MY INVENTION

The most important object of my invention is to save lives and prevent accidents on the highways; prevent further pollution of the air we breathe and save money for the government and the public by preventing defective oil seal replacement and less maintenance by merely capturing fluid drippings in at least one receptacle portion of the apparatus and/or material retained therein or in at least one portion of a separate nestable receptacle and material retained therein.

Another principal object of my invention is to generally prevent the motor vehicle travelled roadway's or highway's or even race tracks surface, from becoming a "high surface tension surface" towards moisture, water or rain by preventing, for example, the highway and race track type of motor vehicle fluid drippings from substantially being deposited, or even spilled, ejected or dumped onto the, for example, highway's surface, and substantially from a receptacle portion of the apparatus, and especially when the motor vehicle is abruptly started, stopped, curving, or even by the motor vehicle's generated draft of air as when the highway and/or race track type of motor vehicle is travelling at a very high rate of speed.

And another principal object of my invention is to prevent the roadway's or highway's surface from becoming a very slimy "ice-like" slippery dangerous motor vehicular travelled surface, and especially when moisture or rain floats on at least one portion of the fluid drippings which are on the highway's surface.

Another important principal object of my invention is to provide therein a receptacle wherein the process portion of this application is performed in substantially at least one portion of the apparatus' receptacle and/or in at least one separate material or even in a separate receptacle and material retained therein. The process for increasing the rate of oxidation and thickening and evaporation of the captured and retained fluid drippings in the receptacle and/or material retained in the apparatus, is substantially accomplished by utilizing the motor vehicular generated draft of cold, warm, hot or arid air; solid or liquid catalyst means for the fluid drippings; mineral fluid or oil eating bacteria means; or use of heat directly or indirectly from the exhaust system.

A yet another principal object of my invention is to provide, place, or even imbue an oil eating bacteria and/or a catalyst or catalytic chemical means, or even a fluid thickening agent, for example, a high molecular weight isobutylene polymer such as that sold under the trademark Paratac and used as an additive for both lubricating oils and greases and/or even by placing or imbueing a submicroscopic fire-dry fumed silica such as that sold under the trademark CAB-O-SIL that differs from precipitated silicas or silca gels, into at least one fluid retaining portion of the apparatus and/or, for example, a separate material retained therein, for substantially reducing the captured, or retained fluid to a reduced volume and/or a thickened state, even when the dripped in type of hydrocarbon mineral fluid is generally accompanied by rain water, slush, surface water, and the like.

Another further principal object of my invention is to have a separate material, pad or mat, or have a separate packaged material which is partitioned, sandwiched and the like, retained in at least one portion of the fluid retaining receptacle portion of the apparatus or retained in a separate nestable receptacle having a separate material retained therein for retaining, absorbing or even substantially further preventing the captured or retained fluid drippings from being spilled, splashed out, or being air ejected or dumped out onto the dry highway's surface, and especially if at least one or the entire top wall portion of the material and/or even the receptacle itself is also at least substantially bezel topped, for example, as is substantially a bed pan and the like, and especially when the first type of motor vehicle is parked out of level; is inclining or reclining; is abruptly started, stopped or curving; or even when it is travelling, for example, at a high rate of speed on a highway, race track, on trestles or in the water, whereby the latter two motor vehicles are respectively for an elevated monorail type of motor vehicle and a boat which is a water type of motor vehicle in this application. The separate material being further a fluid absorbent open cell Scott Industrial Foam or at least one that will efficiently retain and/or absorb the oil or fluid drippings therein, as for example, a silane treated CAB-O-SIL material which is sold under the trademark Silanox material. It is preferred to have a generated draft of air flow draftingly into and out of the receptacle retained material or even a separate nestable subcombination receptacle device as when the motor vehicle is travelling at a high rate of speed on a highway, for example. Silanox is a trademark for a hydrophobic fumed silicon dioxide, from the Cabot Corporation, that has a silane-treated surface whereby oil will readily be absorbed therein but moisture or water will be generally repelled. A silane-treated SCOTT Industrial Foam material is thereby very desirable.

Another object of my invention is to have the above mentioned separate material, as a whole, as a separate packaged partitioned sandwiched one or even a bagged bezel-topped partitioned material which has an integral fluid impermeable outer skin as in a foamed-in-place material which is adhesively retained in at least one portion of the apparatus' receptacle and which material, disclosed package or any combination or portion thereof being disposable, washable and reusable, and even be rechargeable with earth, garden soil, catalyst means, oil eating bacteria means, fluid thickening agent means, oil absorbing or a porous material means, or any combination thereof, as desired, so that at least one process step whereby dehydration and reducing the fluid's volume is efficiently and effectively carried out substantially in the receptacle portion of the apparatus invention or the separate material or separate receptacle and material retained therein.

Another further object of my invention is to provide a separate fluid retaining receptacle in the receptacle portion of the apparatus which is removably secured by at least one very safe means to the motor vehicle, and yet which apparatus is of a safe, solid, cheap structure to buy, secure and maintain, in that the securing thereof to a motor vehicle is accomplished without drilling any holes, adding supports or hangers, or without using other bolt and/or hole means other than that which is actually provided, accessible or even available, or even that which is provided and inserted by the motor vehicle manufacturer, especially in at least one cross, frame, member; as are seat belt anchoring holes, for example; as is later generally disclosed in this specification.

A still another principal object of my invention is to capture and retain the fluid drippings which are substantially retained in a separate material which is retained in a separate receptacle which is retained in the receptacle portion of the apparatus for at least preventing further pollution of the air we breathe, saving millions of dollars for the state and federal government combined and yet enable the motor vehicle owner to save money, at least $45.00 to take an automatic transmission apart to replace a, 1 dollar, fluid leaking seal and at least $95.00 to additionally replace also the rear engine crankshaft fluid seal, and at least $30.00 to $40.00 additionally, for replacing a front crankshaft seal.

And another principal object of my invention is to save lives and prevent accidents on a race track and also prevent a racing car from being excluded from, for example, the important 500 mile Memorial Day Race at Indianapolis, by securing my subcombination apparatus invention or device to the underside of the race car motor vehicle even before any fluid drippings does drip, or is, for example, centrifugally thrown out by a rotating shaft means, since any objectionable showing of fluid drippings or deposit from the racing vehicle results in automatic exclusion from the race, at any time thereof.

Still another important object of my invention is to bring it to the attention of motor vehicle, for example, racing car, car, truck and bus and even a specific motor vehicle such as a boat, for example, manufacturer, and city, state and federal authorities, that my invention should become standard, auxiliary, optional, optional extra or an accessory equipment thereof as are air bags, noise pollution control devices, exhaust pollution control devices, and the like.

A yet another important object of my invention is to further increase the rate of oxidation and thickening of the fluid drippings retained in at least one portion of the apparatus device is to insert fluid thickening agents into the apparatus' receptacle, which agents are, for example, inorganic catalyst, Paratac, CAB-O-SIL, oil eating bacteria and the like fluid thickening means and which fluid thickening means are subjected to at least one portion of the heat from the motor vehicle's exhaust system. Whereby, by the use of exhaust heat convection means, for example, the exhaust heat is being used to further increase the temperature of the retained fluid for substantially increasing its rate of oxidation and thickening as well as dehydrating it to at least one reduced volume portion substantially in a material retained in the receptacle portion of the apparatus or in the material retained in a separate receptacle which is retained in the receptacle portion of the apparatus.

A still further very important principal object of my invention is to increase the rate of oxidation and thickening of the retained fluid drippings in at least one portion of the apparatus having a fluid retaining receptacle and at the same time still indirectly cool, by convection, at least the lubricating oil in the crankcase oil pan sump, and by a generated draft of air which is presently drafting against at least one portion of the lowest underside wall portion of the disclosed sumps, and which generated air is created by the forward drive motion of the motor vehicle, particularly when the vehicle is travelling in hot weather at high rates of motor vehicle speeds on a highway, for example.

And yet a still further object of my invention is to create a minimum of expense for motor vehicle transporting or carrying ferry boat owners through less maintenance in that the motor vehicle's fluid drippings create spots, or even create puddles of fluid, which spots or puddles or substantially prevented on the motor vehicles's parking surfaces, generally in the disclosed boat, and especially if there is a separate material in the receptacle having a catalyst, Paratac, CAB-O-SIL, Silanox, napthnate, oil eating bacteria fluid thickening agent and the like, in the apparatus' receptacle material retained therein.

A yet further object of my invention is to create a minimum of expense for oil or fluid dripping motor vehicle owners by reusing the main supporting receptacle portion of the apparatus, by merely having only a separate material retained in at least one portion of the apparatus' receptacle or having a separate fluid retaining nestable receptacle therein which has a separate fluid absorbent and retaining material retained therein. Accordingly, the material and/or nestable receptacle units will be disposable as a unit, as a whole, when its fluid saturation point has been reached or even exceeded, and even if there is additionally, a catalyst or an oil eating bacteria means for the retained fluid drippings in the nestable material or the nestable receptacle disposable units. Thereby, the apparatus' receptacle portion need not necessarily be fluid impermeable since the separate nestable receptacle will be, accordingly, as desired.

A still yet further object of my invention, whereby a minimum of expense is further made possible for fluid dripping motor vehicle owners is by having the separate material which is retained in at least one portion of the nestable receptacle portion of the apparatus, be cleanable or at least washable and thereby will be reusable, as is also the single element portion of the separate nestable receptacle which is also washable and reusable along with any separate material retained therein, and even if the nestable receptacle's retained material is a fluid absorbent and/or retaining and/or air permeable partitioned material.

A still further additional object of my invention is to increase the rate of oxidation and thickening and evaporation of the fluid retained in the fluid retaining receptacle portion of the apparatus by inserting or piping an oil thickening agent, catalyst means or a chemical acting catalyst means, for example, napthnate and the like, therein. Paratac and even CAB-O-SIL material which is of the treated or untreated type (with silane) may also be inserted to the apparatus, receptacle retained material, and even in the nestable receptacle's retained material as desired. Super hydrophobic treaded CAB-O-SIL is a submicroscopic fire-dry fumed silica having its surface silane treated of the ST-1 grade type which is a new grade of submicroscopic silica with different chemical characteristics from conventional grades in that the surface is silane-treated producing a material which is hydrophobic instead of hydrophilic that may also be used in at least one portion of the apparatus' receptacle or even in a material which is retained substantially in the nestable receptacle, as desired.

A further important object of my invention is to reduce the expense of manufacturing, handling, packaging, shipping and installation of the apparatus device, as a whole, to a motor vehicle manufacturer, by using accessible bolt securing means, accessible bore means or even having special bore means already provided a frame portion of the motor vehicle, for at least one portion of at least one supporting bracket or hanger portion of the apparatus, as are, for example, seat belt anchoring bolt insertion bore means, which are generally inserted in the floor, or even possible the frame by motor vehicle manufacturers. Bolts, lock washers and nut supporting means, for at least one portion of the apparatus may also be supplied or inserted in the bore means and thereby be provided with the motor vehicle, accordingly.

A yet another important object of my invention is to prevent the dripped and captured fluid drippings from being dumped, ejected or even washed or floated out of its fluid retaining receptacle and/or the material retained in the receptacle, by surface or rain water means, by having the material retained in an entirely substantially covered, walled or even a bezeled fluid impermeable nestable receptacle subcombination device. The separate nestable receptacle may also be partially or even entirely bezeled, as desired.

And a yet further object of my invention is to prevent at least one portion of the water of ponds, rivers, lakes, and coastal areas and the like from being polluted by the oil or fluid drippings which are presently dripping from but still being within at least one portion of an inboard motor, of a boat, be it substantially from the oil pan, transmission and the like of the inboard motor, as a whole. Oil or fluid drippings, for example, are generally pumped or washed out of the boat and into the inland waters or a river, pond, lake, and the like for example, and thereby polluting at least one portion of the inland waters. The subcombination apparatus device, as a whole, or at least one portion of the device may be placed or be removably secured, or even be adhesively secured, to at least one portion of the inboard motor's supporting structure or the boat's structure, or any combination thereof, and yet capture at least one portion of the dripping fluid. Also, at least one portion of the apparatus device may be removably secured directly to the inboard motor, motor supports and the like as deemed necessary and/or desired, or even be removably secured by at least one bolt means or even at least one bolt means in a tapped hole, or even by at least one bolt and nut means, of the motor vehicle, for example, as desired.

A boat bilge's fire hazard, fluid dripping pollution and the like, it thereby also generally prevented by use of the subcombination apparatus in the boat, accordingly.

These and other objects and advantages will become more apparent in the course of the following description having the accompanying drawing which forms a part thereof.

FIG. 1 is an isometric top view of one embodiment of the subcombination apparatus device.

FIG. 2 is a sectional view of the apparatus device taken along sectional line 2—2 of the FIG. 1.

FIG. 3 is an isometric top view of another embodiment of a partially or even an, as desired, entirely bezel topped subcombination apparatus device.

FIG. 4 is sectional view taken along sectional line 4—4 of the FIG. 3 apparatus device.

FIG. 5 is an end sectional view of a substantially conventional front cross member having a conventional rigid projection with a portion of an end of the apparatus hooked on one portion of the rigid projection member and also being rigidly and removably secured to the cross member.

FIG. 6 is a top plan sectional view of one portion of the front cross member and showing a generally top view of the rigid projection.

FIG. 7 is a sectional view of a substantially conventional rear or center cross member with a large bracket of the apparatus removably secured thereto by conventional bolt and nut means.

DETAILED DESCRIPTION OF THE INVENTION

The subcombination apparatus which are substantially shown in FIGS. 1 and 3 are designated in portions of in this speciciation as the apparatus, to at least save words and space accordingly.

FIG. 1 shows a fluid impermeable trough-like apparatus having a receptacle 3 which has a bottom wall 4 shown in FIG. 2 and integral rectilinear side 5 and end wall 6 portions which merge into corner 8 portions which integrally and fluid impermeably connect the adjacent side 5 and end 6 portions together. The view further shows two of the side walls 5 having at least one integral side ear 56 means having an opening 55 therein. The large bracket 54 having an opening 55 which is used for removably securing the apparatus 1 to the at least one cross member of the frame of the motor vehicle as shown in FIG. 2, for example, and in the copending applications Ser. Nos. 315,174; 94,793, and 750,094 with conventional bolt securing means 13 and nut 35 as desired. Apparatus rigidizing bezel member 170 is also shown.

The apparatus 1 has a separate fluid retaining benzel-like 61 subcombination receptacle 62 nestingly retained therein. The subcombination receptacle 62 having at least one opening 70 in its upper top surface. Material 20 is also shown retained in receptacle 62. The receptacle 62 may have a catalyst means or even a fluid eating bacteria means placed, charged or imbued therein, as well as having Paratac, or even treated or untreated CAB-O-SIL material therein, accordingly, as desired or deemed necessary for maximum retainment of the fluid drippings.

The treated CAB-O-SIL, for example, is Silanox which is a trademark for hydrophobic fumed silicon dioxide from the Cabot Corporation. Silanox provides exceptional water repelency and yet will readily absorb the oil and/or grease drippings of the motor vehicles. Thereby envionmental damage, or at least the highway's race track's motor vehicle used surface, as well as at least some inland waters, for example, of a river, pond, lake and/or even coastal regions are partially prevented from being oil or fluid polluted. The latter waters are prevented from being polluted substantially by boats where the fluid contaminated interior is cleaned, pumped or dumped overboard along with any water and oil cleaning fluids, oil absorbing powders and the like known to persons skilled in the boat or bilge cleaning art, accordingly.

When Silanox treated absorption agents are employed on, for example, any material 20 which represents any one or which may be any desired combination of material 6, 117, 118, 119, 120 and/or 121, or even an open cell foam, fibered, wood, sand, virmiculite, asbestos, cardboard, partitioned, straw, waste paper and the like, for example, which are all shown as material 20, for simplicity, then the silane-treated material which is retained in the receptacle 3 or 62 will selectively reject water, moisture or dew but still absorb oil or fluid drippings. When the above mentioned receptacle's 3 or even receptacle's 62 retained material, or any retained material mentioned or referenced in this specification, becomes water-soaked, then the material 20 will be inhibited from absorbing oil or fluid drippings.

Prior treatment, of the above disclosed materials as well as, for example, an open or closed cell Scott Industrial Foam material 20, with Silanox would equip the material 20 with super-hydrophobicity, insuring that the bulk of the receptacle's 3 or even receptacle's 62 retained material 20 would remain, at least one portion thereof, moisture or generally water dry and thereby be available and ready for absorption of the oil or fluid drippings on contact therewith.

Treated CAB-O-SIL is a super hydrophobic treated CAB-O-SIL material having a silane-treated surface.

The openings 7 are for insertion of wire and the like means for securing the receptacle 62 or material 20 in receptacle 3, as desired.

FIG. 2 shows a sectional view of receptacle 3 taken along sectional line 2—2 of FIG. 1 and also shows the separate nestable subcombination receptacle 62 with material 20 retained therein and for simplification of the various materials which are disclosed in this specification, the material 20 is to represent any desired one or even substantially all the various materials which are disclosed in this specification, wherein oil or fluid can be absorbed or retained. The view shows an integral rear large bracket 54 rigidly secured to an underside 73 portion of a generally centrally located cross member 67 portion of the motor vehicle's frame, for example, by use of at least one punched or drilled or an available opening 113 (not shown) but which opening 113 is under the nut 35 or head of the bolt 13, or accordingly a separate head of a bolt 13 and a nut 35 means. The small side brackets or ears 56, are shown on each side of receptacle 1, as shown rigidly and yet are removably secured to an underside 74 portion of the flange 66 of the forward or front cross member 65, of the motor vehicle's frame, using here also the available or pre-inserted openings 113 and available on at least one portion of at least one of the motor vehicle's cross member 65 and/or 67, bolt means 13 or even by using a separate inserted bolt 13 and nut 35 means accordingly. At least one U-shaped cross member 87 and 89, or the L-shaped 65 and 67 cross members are generally on most motor vehicles which are used on the highways and race tracks. The openings 113 disclosed above, for example, could be preinserted by the motor vehicle manufacturer as are, for example, seat belt anchoring openings in the floor of some of the motor vehicles. It should be noted that the forward end of the receptacle 3 is to be extended, if so desired, or deemed necessary so that the receptacle 3 will catch fluid drippings from the (not shown) front motor shaft seal, and/or the forward cross member 65 portion of a conventional motor vehicle's frame. And also so that a generated draft of air, one process inherent step in a portion of this invention, as is shown by arrow 49 means, will enter over the forward wall portion of receptacle 3, above and through at least one portion of the material 20, over and against at least one portion of the fluid drippings 36 retained therein and then exiting out over at least a rear wall portion of receptacle 3, when the motor vehicle is, for example, used on a highway. An outer bottom wall portion 64 of the crankcase oil pan sump must be in spaced relation from the material 20 which is retained in receptacle 3 or even in receptacle 62, so that the (not shown) lubricating oil in the oil pan sump 64 will still be indirectly cooled by at least one portion of the generated draft of air which is created when the motor vehicle is in forward drive motion, and especially at high highway or even race track speeds. Thereby, the lubricating oil's temperature is not increased to the point that improper lubrication of the bearings of the crankshaft and the like is created, by breakdown of the lubricating oil film, since one of the lubricating oil's inherent duties or functions of cooling at least one of the motor vehicle's crankshaft, for example, bearings is thereby not obstructed, especially at high or very high motor vehicle highway and/or race track speeds. Also, the rate of, oxidation and thickening of the lubricating oil and its corrosive acid buildup is not increased, in the oil pan sump 64, when the temperature of the oil is maintained at a lower temperature by at least one portion of the motor vehicle's generated draft of air cooling action against the oil pan sump's outer bottom wall. The air cooling is a designed function created by the vehicle manufacturers unless there is an internal cooling of the oil by water piped means from the radiator, as in at least some if not most or all of the present automatic transmissions oil cooling systems. Only then could the bottom of the oil pan sump 64 be abutted or forced against or even be generally imbedded into the material 20.

At least one known prior art oil pan sump has its crankcase oil pan sump's bottom wall corrugated for indirectly additional air cooling of the lubricating oil therein.

The Catalyst 46 means is used as desired in material 20 and receptacle 3, is also shown in FIGS. 1 and 2.

The large rear bracket 54 shown in FIG. 1, may also be removably secured by at least one conventional bolt 13 means or by at least one bolt 13 means and nut 35 means, to the front cross member 65, to its flange 66, to thereby provide still further tear-off proof, greater safety, as is a skidpan or skidplate, and also at the same time prevent undue water flooding of at least one embodiment of the receptacle 3, as desired. Accordingly, the apparatus 1 and its receptacle 3 would, for example, then be removably secured to the cross members 65 and to the flange 68 of the cross member 67, at 180° from that which is shown in FIG. 2. The large 180° rotated, now front bracket 54, as is shown in FIG. 5, may also have its extended forward end 2 edge portion extend upwards and beyond the forward edge portion of flange 66, as desired, so that fluid or oil drippings, shown in tear drop shape in FIG. 2, will be guided into and under the surface 74 of the front cross member 65, or even the front cross member 87, shown in FIG. 5, and substantially into the receptacle 3, as would the oil drippings when they are guided by the surface of bezel 61, by use of its dished down portion 76 which is shown in FIG. 3.

FIG. 1 also shows the large bracket 54 which has a large generally elongated slotted opening 4 which allows the end 2 to be pivotally and tensioningly hooked onto a conventional horn-like projection 9 which is generally welded or is made integral with the cross-member 65 as on some of the motor vehicles, for example, a 1968 and 1969 Pontiac automobile or car. The extended end 2 is pivotally hooked, under tension, on the projection 9 when the other free downwardly manually supported portion of the apparatus 1 is manually forced upwards, so that the two integral side ears 56 may be rigidly and removably secured by bolt 13 and nut 35 means to the surface 73 of the rear cross member 67 or 89, generally as the two side ears 56 are removably secured to the surface 74 of the front cross member 65, for example, of FIG. 1. Of course, the apparatus 1 would then have to be rotated 180° in order to be hooked and/or be removably secured to the cross members 65 or 87, as above disclosed, and as deemed necessary, or as desired, and as shown in FIG. 5, for example. The two side ears 56 may also be hangers.

The two openings 55 which are shown in FIG. 1 may also be additionally used in combination with bolt 13 means and nut 35 means and the corresponding openings 113 which are or must be inserted in the front cross members 65 or 87 generally horizontal surface 74 to also prevent any unforseen and undesired rattling as well as thereby creating a very safe hooked and/or removably secured and virtually a tear-off proof apparatus 1, and in fact becoming a very secure and safe skidpan type of fluid drip retaining apparatus 1, as a whole.

The entire end 2 and even the opening 4 is to be eliminated, if so desired, as one embodiment of this specification in order to maintain the original embodiment of the apparatus 1, as it was disclosed in the referenced copending applications Ser. Nos. 315,174; 94,793 and 750,094 which does show the dashed line forward ear in FIG. 1.

The end 2 is also hooked under tension on the projection 9 so that the apparatus will not rattle at its forward portion when the car, truck and bus motor vehicle is travelling over a rough surface.

The FIG. 1 apparatus 1 may thereby be hooked to the front cross member 65 or 87, by use of opening 4 and its end 2, and also be removably secured by using only one bolt 13 means and nut 35 means at the rear cross member 67 or 89. The end 2 may be hooked and also rigidly removably secured, by using at least one bolt 13 means and nut 35 means, to the cross members 65 or 67 as desired or deemed necessary.

Another embodiment of the apparatus is created by having the two side ears 56 and two side ears 57 may be removably secured to the cross members 65 or 87 and 67 or 89 as desired, whereby the large bracket 54 would not be used or even eliminated.

It is also very desirable to use the large rear bracket 54 which is to be removably secured to the rear or generally centrally located cross member 67 or 89 of the motor vehicle's frame. The two front side ears 56 are thereby to be used as desired, as shown in FIG. 2, for removably securing the apparatus 1 to the front cross member 65 of the motor vehicle's frame since this is now also another embodiment of substantially a skidpan or skidplate type of apparatus 1 and is thereby still a very solid, strong and safe and generally tear-off proof embodiment portion of the apparatus 1 and at the same time at least saving lives and preventing accidents on the highways, for example.

FIG. 3 substantially shows apparatus 1 (not numbered) but being in one of its embodiments as apparatus 14 having a front 164 and rear bezel-like members 61 integrally or cappingly sealed on the top edge of the front and rear walls 6 of receptacle 3 and also partially along the side walls 5 also. The dashed line areas 77 indicates that the bezeled structure 166 may be carried entirely around the top of the walls of receptacle 3, if so desired. It should be noted that when the large forward extending ended bezel 63 or even 164 of the apparatus 1 and/or receptacle 62 shown in FIGS. 2 and 3 is under and extending beyond the forward end of the cross member 65 or 87, then the oil or fluid drippings will still be generally captured and retained in the receptacle 3, material 20 or substantially in the receptacle 62 of FIGS. 2 and 3. And yet the generated draft of air shown by arrow means 49 would be guided and not altogether be blocked off, if so desired, as shown in FIG. 2. The FIG. 3 structure is still very desirable even if the draft of air is blocked off, since proper air cooling of the oil pan pump's bottom wall may still generally be obtained by other paths found by the generated draft of air into receptacle 3, for example, and yet direct front end flooding of the receptacle 3 or receptacle 62, disclosed in FIG. 2 and shown in FIG. 2, and also shown in the apparatus 14 in FIGS. 3 and 4, by surface water, slush and the like is substantially prevented by the large forward extending end 2 of the apparatus 1 that is shown in FIG. 2 or even by use of the large bezel 63 portion of receptacle 62, as is also the function of the forward extended end 2 of the bracket 54, as is disclosed in FIG. 2 hereabove.

However, it is also very desirable to have at least one embodiment of apparatus 1, wherein its receptacle 3 or even within its receptacle 62, is in effect self-cleaning by use of water flooding means where the surface water, rain water and the like will in fact flood the receptacle 3 material 20 and/or generally the receptacles 62 material 20 to the extent that the fluid drippings 36 are at least partially water-flooded out of the receptacle's 3 material 20 and/or generally the receptacle's 62 material 20. Thereby the flooded out portion of the fluid drippings 36 would float on the top surface of the surface water to the soil or dirt, along the sides of the highways and be absorbed therein, and further also being at least partially consumed by oil eating or consuming aerobic bacteria which is generally in the soil or dirt.

The bezel-like portions 61 and 63 or members 61 and 164 will help to retain the material 20 in receptacle 3 or 62 respectively and also substantially prevents the fluid drippings 36, should it be therein in excess volume, from substantially being spilled, air ejected, or virtually dumped out of the receptacle 3 and/or 62 when the motor vehicle is out of level; declining; reclining; abruptly starting, stopped or curving at a high rate of speed.

When it is raining the water flooding of some of the fluid drippings 36 from the receptacles 3 and 62 will tend to make the receptacles self-cleaning.

The ears or brackets 56, having openings 55 therein, are shown in three places, but they may also be in 4, 5, or 6 places on apparatus 1, as deemed necessary. Also the dashed ears 56' is a moved or straightened position of ear 56 having a series (not shown) of holes 55' which will serve to make the apparatus 1 adjustable as desired, to obtain the proper spaced relationship of the receptacle's 3 material 20 to the lowest bottom wall portion of the oil pan sump 64, substantially as is shown in FIG. 2 and which adjustability of the apparatus 1 or material 20 is generally disclosed in copending application Ser. No. 532,831. The ears 56 may also have opening 55' therein and the ends of the ears 56 may also be straight up, 56' as shown by the dashed lines of FIG. 3 or the top formed over at an angle, as is generally shown in FIG. 1 and with as many adjusting holes 55' therein, as is deemed necessary.

FIG. 4 is a sectional view taken along line 4-4 of FIG. 3 and shows the dished down portion 76 of the top of bezel-like member 164, and fluid 36, material 20, dashed line ears 56 with dashed line opening 55' therein and general shape of ears 56 which may be 56' if extended to the top of ears 56, as shown in dashed line outline in FIG. 1, for example. The vertical length of at least one or at least two ears 56 may also be adjustable in a removably secured vertical overlapping adjacent relationship, for example, two vertical ears 56' as shown in FIG. 3. That is, by taking the formed over 56' ear 56 which is taken with at least one of the straight dashed line ears 56', any desired combination of ears 56 of the adjustable type may thereby be formed or constructed according as desired, or deemed necessary.

FIG. 5 cross member 87 is a front cross member 87 as is the front cross member 65, shown in FIG. 2. The cross member 87 has a generally conventional U-shaped cross sectional shape and is shown with a conventional projection member 9 which is welded to the surface 74 of the cross member 87.

The extended end 2 of apparatus 1 is shown hooked on the projecting portion 14 of member 9 by means of opening 4 which is shown in FIG. 1. A bolt 13 means and a nut 35 means is also shown for additionally rigidly removably securing the bracket 54 to the cross member 87 surface 74, if so desired, for prevention of possible rattling greater safety of securing against tear-off proof and the like, as desired. The apparatus 1 was rotated 180° from that shown in FIG. 2, but the FIG. 5 hooked and secured construction may also be again rotated 180° and be removably secured to the U-shaped cross members 87 and 89 (see FIG. 7 also) as is apparatus 1 which is shown in FIG. 2.

FIG. 6 shows the conventional top view shape of the hooked onto projecting member 9, by use of the apparatus' opening 40, as shown in FIG. 5.

FIG. 7 shows a generally conventional and rear or centrally located U-shaped cross member 89 which is located in the same place on a motor vehicle frame as is the cross member 67 of FIG. 2, for example.

In FIG. 7 the bracket 54 is shown removably secured by at least one bolt 13 and nut 35 means to the rear cross member 89. The bracket 54 is shown without the extended end 2 and opening 40 therein, as is generally shown in FIG. 3, whereby the rear ear 58 of FIG. 3 would be replaced by the large bracket 54, as is generally shown in FIG. 2, if so desired.

The receptacle 1 arrangement, shown in FIG. 5, without the bolt 13 and nut 35 means allows a person to hingingly pivot the apparatus slightly downwardly and then slide the end 2 free of the projection 9 to entirely remove the apparatus 1 from the motor vehicle by merely removing only one or even two bolt means 13 from a rear ear 58 or a rear bracket 54, that is substantially shown in FIGS. 3, 5 and 7, for servicing, changing oil and the like of a motor vehicle, if such a very simple arrangement is first deemed desirable but above all safe.

Welding the nut 35 threaded member, providing a threaded strip member of metal (not shown) or even a threaded weld nut 35 member inside the cross members 87 and 89 is also desirable.

The porous and/or air permeable material 20 may have an aerobic hydrocarbon consuming or utilizing bacteria, which is an organic catalyst 46 and the material 20 or receptacle 3 and/or 62 may also have inorganic catalyst 46 means, as well as any liquid catalyst means which is dispersed in the retained fluid drippings 36.

Catalyst for the oxidation of lubricating oils include a wide variety of compounds, some of which are metal catalyst such as compounds of copper, lead, iron, manganese, chromium, vanadium and the like may also be used for the retained fluid drippings 36, accordingly. Naphthenate of iron, copper, lead, silver and cadium can be placed or piped into the retained fluid drippings 36 and also effective catalysts especially if the retained fluid 36 is heated to a higher temperature, as by the heat from the exhaust pipe (not shown here).

The insertion of Paratac directly into the receptacle 3 and/or 62, or into the material 20 retained therein, or even directly into the lubricating oil (not shown) will create a greater thickening effect of the fluid drippings 36, especially when the motor vehicular generated draft of air contacts the Paratac and fluid drippings 36 combination in the receptacle 3 and/or 62, and/or in the material 20 which retained in the receptacles 3 and/or 62.

Paratac is a trademark for a high molecular weight isobutylene polmer used as an additive for both hydrocarbon type of lubricating oils and grease. Particularly applicable in producing the so-called "nondrip", "nonsplatter" oils. Paratac is manufactured by Enjay Mfg. Co. Paratac is well known to persons skilled in the oil or fluid thickening art.

The insertion of CAB-O-SIL which is silane treated treated or untreated, into at least one portion of the receptacle 3 and/or 62, even the insertion of or even substantially imbueing of CAB-O-SIL, treated or untreated into material 20 will also increase the rate of the fluid drippings' 36 thickening, especially if Paratac is also combined with the CAB-O-SIL, since CAB-O-SIL treated or untreated would also act as a fluid 36 thickening agent, made by the Cabot Corporation. Treated CAB-O-SIL is known as Silanox. CAB-O-SIL and Silanox are trademarks and are both manufactured by the Cabot Corporation. CAB-O-SIL is a colloidal pyrogenic silica pigment or more specifically is a submicroscopic fire-dry fumed silica.

The term "summer icing" used in this specification and/or claims is generally derived from the fact that light rain or drizzle, especially after a dry spell in the summer, produces a thin greasy film on the road surface, which is almost as slippery as ice. That is, especially during the first 15 to 30 minutes after it starts to rain and up to an hour or more in light drizzle. The deposited drizzle or rain at first tends to float on the high surface tension of, the roadway's or highway's surface which has the greasy film of oil or fluid drippings 36 or additionally the centrifugally thrown out oil or fluid from motor vehicles generally thereon. Some of the fluid drippings 36 are even absorbed, baked into and the like, on the highways surface before it rains.

The term "viscous hydroplaning" is one which may even be more dangerous than "dynamic hydroplaning" which is generally on the surface of the rain or deposited rain water. Viscous hydroplaning may occur on a seemingly dry motor vehicle travelled highway surface, for example. The seemingly dry surface is no more than a heavy dew mingling with oil or fluid and dust, on a well travelled highway, that will create a greasy film of moisture that may be microscopically thin, but is sufficient to prevent tires from penetrating the greasy film and thereby finding safe traction. Flow of a generated draft of air, which is created by the forward motion of a highway or a race track motor vehicle, into the receptacle 3 and against and over the fluid drippings 36 therein, is very desired for increasing the rate of oxidation and thickening of the retained fluid drippings, especially if a catalyst, soil cultures, naturally occurring catalyst or enzymes, hydrocarbon-oxidizing bacteria, may also be inserted in receptacle 3 and/or 62, or into the 20 retained therein. Soil or earth material may be inserted into receptacle 3 and/or 62, and/or into a separate material 20, which is retained in receptacle 3 and/or 62, if desired.

The bed of catalyst or catalytic chemicals prevent the air from becoming polluted or contaminated by increasing the rate of oxidation and thickening of the otherwise centrifugally thrown-out and/or fluid drippings 36. If the fluid drippings 36, coming or dripping from the crankcase, having gasoline therein was allowed to leak or drip and thereby forming a fluid mess or puddle or be allowed to be spilled or dumped onto a hot sun heated surface and thereby be exposed to the hot sunlight, the emission of hydrocarbons therefrom would become noxious generally further polluting of the air and possibly irritating one's eyes by possible formation of some peroxybenzoyl nitrate.

It is also to be understood that all, one or any combination of catalyst 46 or even material 6, 117, 118, 119 and 120 thickening agents, and the like disclosed and in my copending applications Ser. Nos. 508,624; 530,217; and 532.831 may be used in this invention or in receptacle 3 and/or 62, as desired.

It is a fact that the state and federal government is presently cleaning the motor vehicle travelled surfaces with surface scrubbing machines, surface cleaning machines or cleaning with detergents, soaps, and the like. The state alone is presently paying thousands of dollars to clean the thruway areas and especially the toll collecting areas and thereby millions of dollars is saved for all concerned by use of this subcombination apparatus device or invention, disclosed in this specification.

All matter is subject to loss due to evaporation and the rate of this loss is due to a function of the physical properties of the material or the retained fluid 36 and especially if the retained fluid 36 is subjected to a drafting flow of hot arid air. The fluid retaining receptacles 3 and 62 also being subjected to a vibrating or agitating motion, as when it is secured under a highway type of motor vehicle which is in forward drive motion and especially over a roughly travelled motor vehicle surface and the like. the rate of oxidation and thickening of the retained fluid 36 by the generated draft of air may also be further increased by forming or adjusting the shape of the height or length of the ears 56 and bracket 54, receptacle 3 and/or 62, portions of receptacle 3 and/or 62, or even the spacing of the top surface of material 20 to at least one portion of the motor vehicle's underside.

The fluid retaining receptacles 3 and 62 disclosed in this specification may also be fluid permeable or fluid impermeable, accordingly as desired or deemed necessary. The receptacle 62 may be made of metal, plastic or as are new milk cartons which are made of paper or cardboard, and coated with polyethylene, especially the bezel-like 61 receptacle 62 shown in FIG. 1, for example, that could also be made to be a disposable unit along with material 20 therein. The disclosed fluid 36 retaining material 20, such as earth, may also be, accordingly, inserted into material 6, 117, 118, 119 and 120 and/or any combination thereof that is desired or deemed necessary and is thereby still a porous material 20, as a whole.

The latter 6 materials are disclosed, for example, in my copending application Ser. No. 532,831.

The latter portion of this specification contains further descriptive detailed materials, apparatus receptacle and retaining means, coatings and the like which may be necessary for a more detailed specification. Fabrics which are woven and nonwoven are used for the outside, inside, or core of the fluid 36 retaining receptacle 62 and are to be plastic or elastomer coated as desired or deemed necessary for creating fluid impermeability. Nylon which is coated with Buna N also makes a good barrier for the retained fluid drippings 36. Elastomers such as natural rubber, SBR, Polyisoprene, Neoprene, Silicone, Hypalon, Polybutadiene, Butyl, Polyurethane, Nitrile, Polysulfide, Polyacrylate, Fluorcarbon and the like are to be used as desired or deemed necessary for a coating boot, sleeve, bag, and the like, for the oil resistant or even fluid impermeable receptacle 62 which are reusable or disposable and are with or without bezels 61 as is on receptacle 62. The receptacle 62 may also have an open cell foam material 20 foamed therein if so desired, or even a steel wool material 20, loose or bonded fibers or hair, and the like and with oil resistant, elastomer or plastic material as a binder, are all also to be used as being material 20, and especially a material 20 having or a material therein that is treated with Silanox.

Some of the fire-retardant type, fluid absorbent and the like type as well as being an open-cell foam material is made from at least one of the latex rubber, polyvinal, polyether, urethane, polyurethane, chloride, polyester, polyepoxies, vinyl, phenolic, polyolefin, silicone, and the like materials which are or can be rigid, semi-rigid, flexible or super soft, and used as desired or deemed necessary to thereby also be a Silanox-treated or untreated, as desired, material 20. Since glass fibers are the fastest growing and their applications are almost entirely industrial and are fluid resistant and heat resistant and they are thereby also preferred for being material 20. Other fibers which can be used are asbestos, sisal, cotton, jute, man-made and metallic fibers. The resin used are preferred to be polyesters but epoxies, phenolics and silicones are also to be considered for constructing the receptacle 62 as desired or deemed necessary.

A plastic film or sheet which is fluid impermeable may also be hand nested to thereby form receptacle 62 with material 20 therein, that is shown in dashed line outline in FIG. 3. The material 20 is further preferred to be a Silanox-treated air permeable and fluid permeable, open-cell foam, fibrous, curly hair bonded material, also glass wool, man-made fiber which is loose, in batting form, or which is resin or elastomer (oil resistant) bonded together. The term "material 20" or even "material means" will substantially designate all of or any desired combination of the substances and materials disclosed and/or referenced in this specification, treated and/or untreated with Silanox, as desired.

Ninety percent of the urban Americans live in localities with polluted air, but only half of all these people are served by local air pollution control programs. It is unmistakably clear that air pollution is associated with important respiratory diseases, such as lung cancer, emphysema, chronic bronchitis, and asthma, but progress or no program is effective if it is not backed by the public.

When hydrocarbons, oxides of nitorgen and the like are emitted from the dripped or centrifugally thrown out fluid which is on a hot, sun-heated surface, or is exposed to the hot sunlight, a photochemical reaction produces irritants and haze. When these by-products are retained in an area by climatic conditions or topographical barries, the concentration of irritants can produce severe discomfort. The Los Angeles basin has all the necessary ingredients to produce such conditions about 100 days per year.

In this time period of every increasing vehicular drive and high-speed travelling, whereby an ever increasing amount of vehicles was estimated 101,000,000 to be on the highways, thruways, freeways, turnpikes, streets, roads and the like, by 1972. This is an indicator to provide safer, cleaner and uncontaminated highway surfaces on which all persons in motor vehicles must travel, and this is the basis for this very needed skidpan apparatus device or invention.

The polygonal, rectangular square, round troughy, triangular or other polygonal configurations of the receptacle 3 and/or 62 shape and the like are and will be apparent to those skilled in the art, as well as the shape of the cross members 65, 67, 87 and/or 89, once this invention is disclosed of its importance and need thereof, by at least the motor vehicle public as mentioned in the foregoing specification and/or objects. The receptacle 3 and/or 62 are to have square, rounding sharp, blunt and the like shaped corners which merge the rectilinear, curvilinear or other suitable band-like portions thereof into a fluid impermeable structure, as desired, by forming, coining, welding and the like.

The foregoing description and the drawings are given merely to explain and illustrate the invention and is not to be limited thereto, except insofar as the appended claims are so limited.

While several embodiments of this subcombination apparatus device or invention have been disclosed, it is understood that the inventive idea may be carried out in a number of ways. The above disclosed apparatus device or invention is, therefore, not limited to the precise details described, but it is intended to cover all variations and modifications falling within the scope of the appended claims.

I claim:

1. A substantially skidpan apparatus device for retaining fluid drippings which drip from a motor vehicle having a metal frame which has a front cross member having an integrally extending horn-like projection and a generally centrally located cross member comprising, in combination: a polygonal shaped open topped fluid retaining and fluid impermeable skidpan receptacle having two outwardly formed integral side ear members with one of said side ear members generally extending at an angle from each of two upper rectilinear side wall portions and also having one integrally outwardly formed large bracket member having a large generally elongated opening and extending outwardly from one upper integral rectilinear end wall portion of said receptacle and when said apparatus device is to be removably secured to said vehicle said side ear members are removably secured to said centrally located cross member by use of threaded bolt means and threaded member means while said bracket member is threadingly hooked over and onto said horn-like projection by use of said elongated opening in said bracket member for suspending and hookingly disposing said receptacle under at least one portion of said vehicle and for receiving and substantially retaining fluid drippings which dripped substantially into said receptacle from at least one underpart portion of said vehicle; said receptacle having a bottom wall and two integral rectilinear side wall portions and two integral rectilinear end wall portions that merge integrally at four corner portions and having said side ear members and said bracket member extending integrally from said side wall portions and said end wall portion respectively; said ear members having an opening for removably receiving a shank portion of said bolt means therein; said receptacle having a substantially porous material retained therein for substantially retaining at least one portion of said drippings therein; said material having at least one portion of its top surface in spaced relation to at least one lowest underside outer wall surface portion of a crankcase lubricating oil pan sump of said vehicle so that at least one engine will not be ruined by still having a motor vehicle generated draft of air indirectly cool the lubricating oil in the crankcase oil pan sump when at least one said vehicle is travelling at a high rate of speed on the highways.

2. The combination as set forth in claim 1 wherein at least one portion of said material having a hydrophobic fumed silicon dioxide material which is sold under the trademark Silanox retained therein.

3. The combination as set forth in claim 1 wherein at least one portion of said material has soil retained therein.

4. The combination as set forth in claim 1 wherein at least one portion of said material having a catalyst means retained therein for increasing the rate of oxidation and thickening of said fluid drippings retained substantially in said material.

5. The combination as set forth in claim 1 wherein a hydrocarbon consuming bacteria is retained in at least one portion of said material.

6. The combination as set forth in claim 1 wherein said material is an open cell foam material.

7. The combination as set forth in claim 1 wherein a high molecular weight isobutylene polymer fluid sold under the trademark Paratac is retained in at least one portion of said receptacle.

8. The combination as set forth in claim 1 wherein said material is a fluid absorbent material.

9. The combination as set forth in claim 1 wherein said material is a washable material and then is still a reusable material in said receptacle.

10. The combination as set forth in claim 1 wherein at least one portion of said material is fire resistant.

11. The combination as set forth in claim 1 wherein said bracket having at least one opening for receiving the shank portion of a threaded bolt means which has a threaded nut means on one end thereof for removably securing said bracket to said front cross member by said bolt means and said nut means so that said bracket will not rattle and to provide a more rigid and safer removably secured and hooked said apparatus device.

12. The combination as set forth in claim 1 wherein said material is adhesively secured to at least one inside bottom wall portion of said receptacle.

13. The combination as set forth in claim 1 wherein said bracket is hooked under tension onto said hornlike member when said side ears are removably secured to said centrally located cross member with said bolt means and said member means.

14. A substantially skidpan apparatus device for retaining fluid drippings which drip from a motor vehicle having a metal frame which has a front cross member and a generally centrally located cross member comprising, in combination: an elongated polygonal shaped open topped fluid retaining and impermeable skidpan receptacle having two integral side ear members with one of said side ear members extending outwardly from an upper portion of each two integral rectilinear side wall portions and also having one integral large bracket member extending outwardly from one upper integral rectilinear end wall portion of said receptacle and when said apparatus device is being removably secured to said front cross member and said centrally located cross member said side ear members are removably secured to said front cross member and said bracket member is removably secured to said centrally located cross member by use of threaded bolt means and threaded member means for suspending and disposing said receptacle under at least one portion of said vehicle and for receiving and substantially retaining fluid drippings which have dripped substantially into said receptacle from at least one underpart portion of said vehicle; said receptacle having a bottom wall and two integral rectilinear side wall portions and two integral rectilinear end wall portions that merge integrally and fluid impermeably at four corner portions thereof and having said side ear members and said bracket member extending integrally from said side wall portions and one of said end wall portions respectively; said ear members and said bracket member each having at least one opening for removably receiving a shank portion of said bolt means therein; said receptacle having a substantially porous material retained therein for substantially retaining at least one portion of said drippings therein and yet said material and said receptacle will tend to be self-cleaning of at least one portion of said fluid drippings by rain water flooding means when said vehicle is travelling over a rain water surface on a highway at a high rate of speed; said material having at least one portion of its top surface in spaced relation to at least one lowest underside outer wall surface portion of a crankcase lubricating oil pan sump of said vehicle.

15. The combination as set forth in claim 14 wherein said bracket having at least two said openings therein for removably securing said bracket to said cross member by at least two said bolt means and two said member means.

16. A skidpan apparatus device for retaining fluid drippings which drip from a motor vehicle having a metal frame which has a front cross member and a generally centrally located cross member comprising, in combination: an elongated polygonal shaped open topped fluid retaining and fluid impermeable skidpan receptacle having two integral outwardly formed side ear members with one of said side ear members extending from an upper portion of each of two rectilinear side wall portions of said receptacle and also having one integral outwardly formed large bracket member extending from one upper integral rectilinear end wall portion of said receptacle and when said apparatus device is to be removably secured to said vehicle said large bracket member is removably secured to said front cross member and said side ear members are removably secured to said centrally located cross member by use of threaded bolt means and threaded member means for suspending and disposing said receptacle under at least one portion of said vehicle and for receiving and substantially retaining fluid drippings which have dripped substantially into said receptacle from at least one underpart portion of said vehicle; said receptacle having a bottom wall and two integral rectilinear side wall portions and two integral rectilinear end wall portions that merge integrally and fluid impermeably at four corner portions thereof; said ear members and said bracket member each having at least one opening for removably receiving a shank portion of said bolt means therein; said receptacle having a substantially porous material retained therein for substantially retaining at least one portion of said drippings therein and yet said material and said receptacle will tend to be self-cleaning of at least one portion of said fluid drippings by rain water flooding means when said vehicle is travelling at a substantially high rate of speed over a rain water surface on a highway; said material having at least one portion of its top surface in spaced relation to at least one lowest underside outer wall surface portion of a crankcase lubricating oil pan sump of said vehicle.

17. The combination as set forth in claim 16 wherein said bracket member having an extended dished down center portion for substantially guiding at least one portion of said fluid drippings under said cross member and substantially into said receptacle.

18. The combination as set forth in claim 16 wherein said bracket having an enlarged generally elongated opening therein for removably hooking said bracket on a horn-like integral projection of said front cross member.

19. A substantially skidpan apparatus device for retaining fluid drippings which drip from a motor vehicle having a metal frame which has a front cross member which has an integrally extending horn-like projection and a generally centrally located cross member which is rearward of said front cross member comprising, in combination: an integral one-piece elongated polygonal shaped substantially open topped receptacle having two outwardly formed integral side ear members having at least one opening therein with one of said side ear members extending from each of two upper rectilinear side wall portions and also having one integrally outwardly formed large bracket member having a generally elongated opening therein and extending outwardly from one upper integral rectilinear end wall portion of said receptacle; said side ear members to be removably secured to said centrally located cross member by use of threaded bolt means and threaded member means; said ear members having said opening for removably receiving at least one portion of said bolt means therein while said bracket member is already threadingly hooked onto said horn-like projection by use of said elongated opening in said bracket member for suspending and hookingly disposing said receptacle under at least one portion of said vehicle and for receiving and substantially retaining fluid drippings which drip substantially into said receptacle from at least one underpart portion of said vehicle; said receptacle having a bottom wall and two integral rectilinear side wall portions and two integral rectilinear end wall portions that merge integrally into four corner portions thereof and having said side ear members and said bracket member extending integrally from said side wall portions and said end wall portion; said receptacle having a separate nestable fluid impermeable and fluid retaining nestable receptacle retained therein; said nestable receptacle having a bottom wall and two integral rectilinear side and end wall portions that merge integrally and fluid impermeably into four corner portions thereof; said nestable receptacle having a substantially porous material retained therein for retaining at least one portion of said fluid drippings therein; said material having at least one portion of its top surface in spaced relation to at least the lowest underside outer wall surface portion of a crankcase lubricating oil pan sump of said vehicle.

20. The combination as set forth in claim 19 wherein said open topped receptacle is fluid impermeable and fluid retaining to an upper portion of said side wall portions and said end wall portions.

21. The combination as set forth in claim 19 wherein said nestable receptacle having the entire upper portion of said side walls, said end walls and said four corner portions formed integrally inwardly for forming a surrounding integral bezel-like flange.

22. The combination as set forth in claim 21 wherein at least one surface portion of said material is treated with silane so that fluid drippings will be readily absorbed in said material and water will be generally repelled.

23. The combination as set forth in claim 21 wherein said material having a catalyst means retained therein for at least reducing said drippings to a reduced volume and thicker state in said nestable receptacle.

24. The combination as set forth in claim 21 wherein said material is soil.

25. The combination as set forth in claim 21 wherein said material has hydrocarbon consuming bacteria retained in at least one portion thereof.

26. The combination as set forth in claim 21 wherein said material has a high molecular weight isobutylene polymer fluid which is sold under the trademark Paratac retained in at least one portion thereof.

27. The combination as set forth in claim 21 wherein said material is also an upstanding partitioned material.

28. The combination as set forth in claim 21 wherein said material is an open cell foam material.

29. The combination as set forth in claim 28 wherein said foam material is fire-retardant.

30. The combination as set forth in claim 28 wherein said foam material is fluid absorbent.

31. The combination as set forth in claim 28 wherein said foam material is fluid absorbent and fire-retardant.

32. The combination as set forth in claim 28 wherein said foam material is fluid absorbent and is treated with silane.

33. The combination as set forth in claim 19 wherein said material is a foamed in place foam material.

34. The combination as set forth in claim 28 wherein said material having a hydrocarbon consuming bacteria retained therein.

35. The combination as set forth in claim 19 wherein said member means is a threaded nut means for aiding in releasably securing said ear members to said rear cross member.

36. The combination as set forth in claim 19 wherein said side walls of said open topped receptacle each having at least one upper portion of each of said side walls inwardly formed for creating a bezel member and greater elongated rigidity to said apparatus device and for retaining said nestable receptacle in said open topped receptacle.

37. The combination as set forth in claim 19 wherein said bracket member having at least one opening therein for removably receiving a shank portion of a threaded bolt means which has a threaded means on its threaded portion for removably securing said bracket to said front cross member so that said bracket will not tend to rattle when said vehicle is travelling over a rough surface.

38. The combination as set forth in claim 1 wherein said side wall portions each having at least one upper portion of each of said side walls inwardly formed for creating a bezel member and greater elongated rigidity to said apparatus device.

39. The combination as set forth in claim 14 wherein said side wall portions each having at least one upper portion of each of said side walls inwardly formed for creating a bezel member and greater elongated rigidity to said apparatus device.

40. The combination as set forth in claim 1 wherein said material is fire-retardant.

41. The combination as set forth in claim 1 wherein said material is a foam material which is fire-retardant.

42. The combination as set forth in claim 14 wherein said material is a foam material which is fire-retardant.

43. A skidpan apparatus device for retaining fluid drippings which drip from a motor vehicle having a metal frame which has a front cross member having an integrally extending horn-like projection and a generally centrally located cross member comprising, in combination: a polygonal shaped open topped fluid retaining and fluid impermeable receptacle having one outwardly formed integral ear member which extends at an angle from a first rectilinear end wall portion of said receptacle; said receptacle also having one integrally outwardly formed large bracket member having a large generally elongated opening and extending outwardly from a second upper integral rectilinear end wall portion of said receptacle and when said apparatus device is to be removably secured to said vehicle said ear member is removably secured to said centrally located cross member by use of threaded bolt means and threaded member means while said bracket member is already threadingly hooked over and onto said horn-like projection by use of said elongated opening in said bracket member for and hookingly disposing and suspendingly removably securing said receptacle under at least one portion of said vehicle and for receiving and substantially retaining fluid drippings which dripped substantially into said receptacle from at least one underpart portion of said vehicle; said receptacle having a bottom wall and two integral rectilinear side wall portions and said first and second rectilinear end wall portion that merge integrally at four corner portions of said receptacle; said ear member having at least one opening for removably receiving a shank portion of said bolt means therein; said receptacle having a substantially porous material retained therein for substantially retaining at least one portion of said drippings therein.

44. The combination as set forth in claim 43 wherein the two side walls each having at least one upper portion of each of the side walls inwardly formed for creating a bezel member and greater elongated rigidity to said apparatus device.

45. The combination as set forth in claim 43 wherein at least one portion of said material is fire-retardant.

46. The combination as set forth in claim 43 wherein said material is an open cell foam material which is fire-retardant.

47. The combination as set forth in claim 44 wherein said material is fire-retardant.

48. The combination as set forth in claim 44 wherein said material is an open cell foam material which is fire-retardant.

49. The combination according to claim 44 wherein at least one portion of said material having a hydrophobic fumed silicon dioxide material which is sold under the trademark Silanox retained therein.

50. The combination as set forth in claim 43 wherein said large bracket member having at least one opening therein for receiving a shank portion of a threaded bolt means which removably secures said bracket member to said front cross member and so that said bracket member will not rattle against said front cross member.

51. The combination according to claim 43 wherein at least one portion of said material having a hydrophobic fumed silicon dioxide material which is sold under the trademark Silanox retained therein.

52. The combination according to claim 43 wherein said material is a foam material which is fire-retardant.

* * * * *

UNITED STATES PATENT OFFICE
CERTIFICATE OF CORRECTION

Patent No. 3,980,153          Dated September 14, 1976

Inventor(s) Peter Andrews

It is certified that error appears in the above-identified patent and that said Letters Patent are hereby corrected as shown below:

On the Title Pate, Item /54/ "DROP" should read ---- DRIP ----.

Column 1, line 1, "DROP" should read ---- DRIP ----.

Signed and Sealed this

Twelfth Day of April 1977

[SEAL]

Attest:

RUTH C. MASON
*Attesting Officer*

C. MARSHALL DANN
*Commissioner of Patents and Trademarks*